(12) United States Patent
Lee

(10) Patent No.: US 7,409,214 B2
(45) Date of Patent: Aug. 5, 2008

(54) CELL SEARCH METHOD FOR INTER-SYSTEM HANDOVER IN A MOBILE STATION

(75) Inventor: Jae-Hwan Lee, Seongnam-si (KR)

(73) Assignee: Samsung Electronics Co., L.L.P., Suwon-si (KR)

( * ) Notice: Subject to any disclaimer, the term of this patent is extended or adjusted under 35 U.S.C. 154(b) by 803 days.

(21) Appl. No.: 10/740,896

(22) Filed: Dec. 22, 2003

(65) Prior Publication Data
US 2005/0043046 A1    Feb. 24, 2005

(30) Foreign Application Priority Data
Aug. 18, 2003   (KR) ...................... 10-2003-0057029

(51) Int. Cl.
*H04Q 7/20* (2006.01)
(52) U.S. Cl. ..................................... 455/436; 370/324
(58) Field of Classification Search ................ 455/436, 455/439, 442, 502, 432, 444, 522.1; 370/331, 370/324, 332, 335
See application file for complete search history.

(56) References Cited

U.S. PATENT DOCUMENTS 6,246,673 B1 * 6/2001 Tiedemann et al. ......... 370/333
6,704,581 B1 * 3/2004 Park et al. ................ 455/553.1

* cited by examiner

*Primary Examiner*—Tu Nguyen
(74) *Attorney, Agent, or Firm*—Roylance, Abrams, Berdo & Goodman, L.L.P.

(57) ABSTRACT

A cell search method for handover between an asynchronous mobile communication system's base station and a synchronous mobile communication system's base station. A border base station, which is an asynchronous base station neighboring a synchronous mobile communication network, acquires information on a GPS satellite time, a reference time of the synchronous mobile communication network, generates base station frame number (BFN) synchronized to the satellite time and a system frame number (SFN) having a predetermined offset for the BFN for each cell, generates a system information block including a difference value between the BFN and the SFN, and transmits the system information block over a common channel along with the SFN. A dual-mode mobile station receives an SFN for each cell and a system information block from the border base station, acquires the satellite time synchronization, extracts a neighbor list of synchronous base stations, including PN offset information, from the system information block, searches a neighbor cell of a synchronous system at times when the PN offsets have elapsed from the satellite time synchronization, and reports the search result to the border base station. The cell search method contributes to rapid and efficient cell search during inter-system handover.

20 Claims, 8 Drawing Sheets

CELL SEARCH METHOD FOR INTER-SYSTEM HANDOVER IN A MOBILE STATION

PRIORITY

This application claims priority under 35 U.S.C. § 119 to an application entitled "Cell Search Method for Inter-System Handover in a Mobile Station" filed in the Korean Intellectual Property Office on Aug. 18, 2003 and assigned Serial No. 2003-57029, the contents of which are incorporated herein by reference.

BACKGROUND OF THE INVENTION

1. Field of the Invention

The present invention relates generally to a handover method in a mobile communication system, and in particular, to a cell search method for handover between an asynchronous mobile communication system's base station (or asynchronous base station) and a synchronous mobile communication system's base station (or synchronous base station).

2. Description of the Related Art $3^{rd}$ generation (3G) mobile communication systems employ code division multiple access (CDMA) technology, and provide consistent service capable of transmitting packet-based text, digitized voice and video, and multimedia data at a high rate of over 2 Mbps no matter where a user of a mobile phone or terminal is in the world. Such 3G mobile communication systems are classified as either universal mobile telecommunication service (UMTS) adopted as the European standard or international mobile telecommunications-2000 (IMT-2000), adopted as the U.S. standard.

UMTS is an asynchronous mobile communication system employing CDMA modulation based on global system for mobile communication (GSM) and general packet radio services (GPRS) technologies which are extensively used in Europe and other regions. IMT-2000 is a synchronous mobile communication system based on a $2^{nd}$ generation (2G) CDMA system such as IS-95 and J-STD008, which is used in South Korea, the United States, and Japan. The two systems are moving toward harmonization, and accordingly, research is being conducted on several technologies that offers compatibility between the two systems. One important field of research is directed towards technology related to handover which may occur while a mobile station travels between the two systems.

Handover is the term used for technology that enables a user to perform communications without dropping calls, even though a mobile station travels from one cell to another in a cellular mobile communication system. Handover is classified into two types: soft handover and hard handover. In a soft handover situation, the mobile user is performing communications while using a plurality of channels in an area where two or more cells overlap with each other. If the quality of a particular channel decreases below a predetermined threshold, one of the channels, the corresponding channel, is dropped. In a hard handover situation, the channel to the previous cell (i.e., the cell the mobile user is moving away from) is dropped and then access to a neighbor cell is attempted as the mobile station moves between cells.

A mobile station undergoing communication measures information on neighbor cells and reports the measured information to a base station in at least two situations: first, if a level of a received pilot signal is lower than or equal to a threshold; and, second, at the request of the base station. The operation of measuring information on neighbor cells is called "cell searching." The reported information is used to determine when handover should occur. During standby, handover is automatically performed in a mobile station without direction of the system. During a call, a handover direction is transmitted to the mobile station over a traffic channel in the case of a synchronous mobile communication system, and over a dedicated channel in the case of an asynchronous mobile communication system.

When a dual-mode mobile station moves from an asynchronous mobile communication system to a synchronous mobile communication system, hard handover occurs. This is because it is impossible for the mobile station to simultaneously connect channels to the two different systems. When hard handover is performed, communication between a mobile station and an asynchronous mobile communication system is discontinued for a time when the mobile station is searching information on neighbor cells.

In a mobile communication system employing CDMA technology, a terminal performs cell search during idle-state handover or active-state handover. In a synchronous CDMA system, all base stations are synchronized using a global positioning service (GPS) satellite. Each base station can then inform the mobile stations of pseudo-random noise (PN) offset information for a pilot from its neighbor cell. This enables the mobile stations to perform neighbor cell search at a time when the corresponding PN offset has elapsed from a reference time. Knowing the PN offset time allows the mobile station to complete the neighbor cell search in a short period of time. Cell search during initial power on requires a long time, however, since time alignment with the base station is necessary.

When a mobile station moves from a service area of an asynchronous mobile communication system to a service area of a synchronous mobile communication system, the mobile station must perform all the same procedures as those performed during the initial cell search. This is because the mobile station does not have timing information for a synchronous base station. During cell search for a synchronous base station (hereinafter referred to as "CDMA cell search"), a mobile station first searches a pilot signal. Thereafter, the mobile station decodes a message on a synchronization channel to acquire information (e.g., PN offset and system time information), so that the mobile station can communicate with the synchronous base station, and then matches its synchronization to the synchronous base station.

The synchronization information message on a synchronization channel is written in a synchronization channel frame transmitted from a synchronous base station. Since the synchronization channel has 96 transmission bits per 80 ms frame, and a synchronization signal message including PN offset information is 221 bits in length, a mobile station requires at least 240 ms (it takes 2 full frames (2×96=198)+23 bits of a third frame, to transmit all 221 bits; therefore, 3 frame transmission time periods are needed. 80 ms×3=240 ms) for a message analysis time. In addition, when a reception start point is not identical to a message start point, the mobile station needs to interrupt communication for about 513.3 ms. This includes the time it waits for a start point of the synchronization signal message, even though it is assumed that a received frame has no error. An increase in the cell search time may cause a loss of communication data between an asynchronous mobile communication system and a mobile station.

For the same reason, a mobile station in communication with an asynchronous mobile communication system cannot perform a CDMA cell search, simply with a compressed mode for monitoring other frequency bands for an idle period of a frame, secured by data compression. This is because a CDMA cell search generally requires a long search time, and cannot be completed in the relatively short idle period (usually shorter than 10 ms) of a frame.

SUMMARY OF THE INVENTION

It is, therefore, an object of the present invention to provide an apparatus and method for performing handover from an asynchronous mobile communication system to a synchronous mobile communication system by a dual-mode mobile station.

It is another object of the present invention to provide an efficient cell search method for performing handover from an asynchronous mobile communication system to a synchronous mobile communication system.

It is further another object of the present invention to provide a method for minimizing a cell search time by synchronizing an asynchronous base station to a neighboring synchronous base station in order to support handover from an asynchronous mobile communication system to a synchronous mobile communication system.

In accordance with a first aspect of the present invention, there is provided a method for providing timing information for inter-system handover by an asynchronous base station in a mobile communication system that includes an asynchronous mobile communication network associated with at least one asynchronous base station, using independent synchronization, and a synchronous mobile communication network associated with at least one synchronous base station using synchronization matched with a satellite time. The method comprises the steps of acquiring information on the satellite time and generating a base station frame number (BFN) synchronized to the satellite time and a system frame number (SFN) having a predetermined offset for the BFN for each cell, and generating a system information block that includes a difference value between the BFN and the SFN. The method further comprises transmitting the system information block over a common channel along with the SFN.

In accordance with a second aspect of the present invention, there is provided a method for performing inter-system handover from an asynchronous base station to a synchronous base station by a mobile station in a mobile communication system that includes an asynchronous mobile communication network associated with at least one asynchronous base station using independent synchronization, and a synchronous mobile communication network associated with at least one synchronous base station using synchronization matched with a satellite time. The method comprises the steps of receiving a system frame number (SFN) of the asynchronous base station for each cell and a system information block from the asynchronous base station over a common channel, and extracting a difference value between a base station frame number (BFN) of the asynchronous base station, synchronized to the satellite time, and the SFN, from the system information block. The method further comprises acquiring frame synchronization of the base station synchronized to the satellite time by applying the difference value to the SFN.

In accordance with a third aspect of the present invention, there is provided a mobile communication system including an asynchronous mobile communication network associated with at least one asynchronous base station using independent synchronization, and a synchronous mobile communication network associated with at least one synchronous base station using synchronization matched with a satellite time. The system comprises at least one border base station associated with the asynchronous mobile communication network, the border base station using synchronization matched to the satellite time and providing timing information for the synchronization, and a dual-mode mobile station capable of communicating with both the asynchronous mobile communication network and the synchronous mobile communication network, the dual-mode mobile station being synchronized to the timing information provided from the border base station.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will now be described in detail with reference to the annexed drawings. In the following description, a detailed description of known functions and configurations incorporated herein has been omitted for conciseness.

Figure 1:
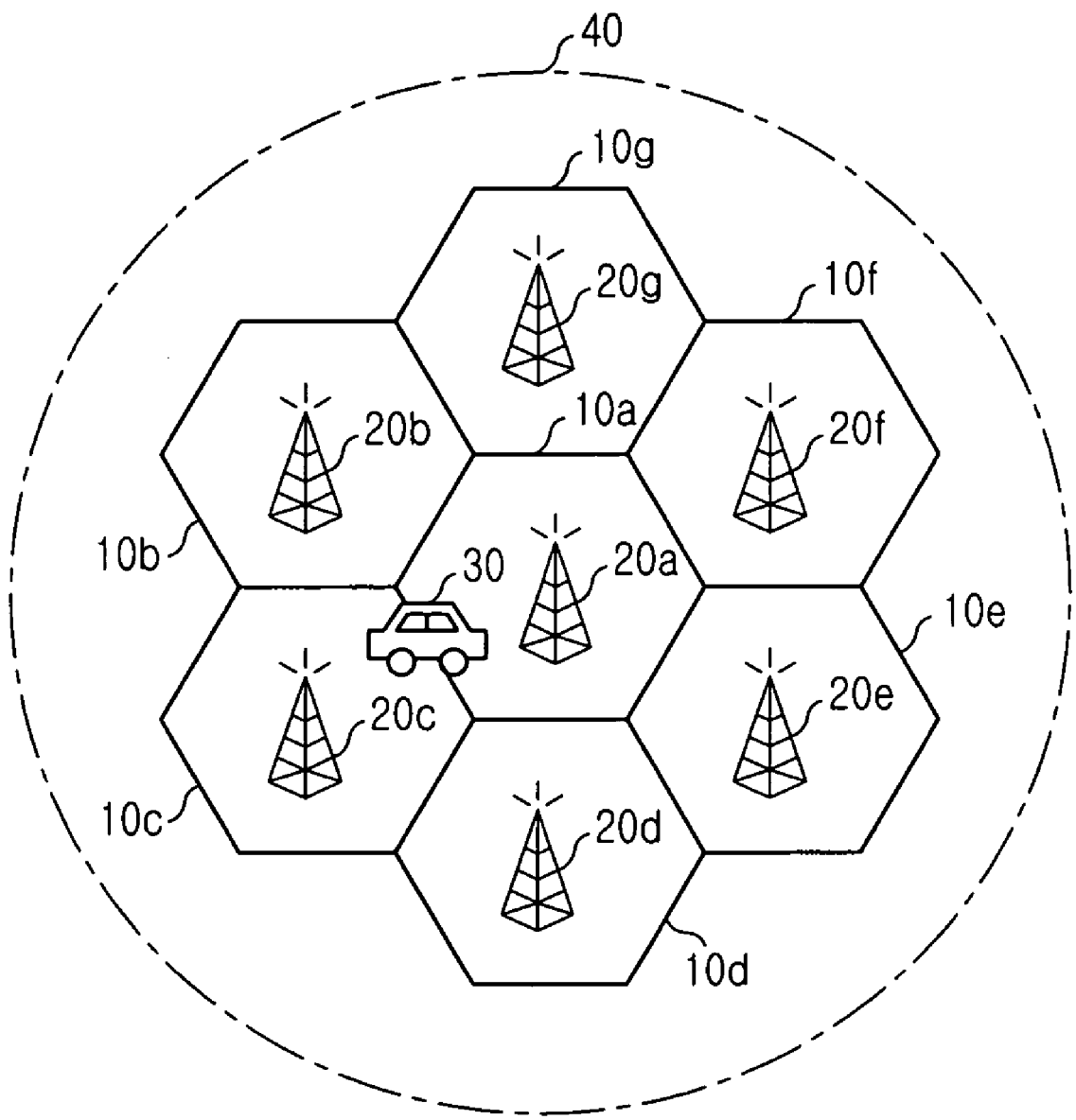
FIG. 1 is a diagram illustrating a configuration of a cellular mobile communication network to which the present invention is applied.

FIG. 1 is a diagram illustrating a configuration of a cellular mobile communication network to which the present invention is applied. Referring to FIG. 1, the entire service area of a mobile communication network 40 is divided into a plurality of neighboring cells 10a to 10g. Although the cells 10a to 10g are illustrated in the form of a hexagon, they actually have irregular shapes according to strength of the transmitted electromagnetic waves and the arrangement of obstacles. In most cases, the cells 10a through 10g overlap with neighboring cells. The cells 10a to 10g are associated with corresponding base stations 20a to 20g that provide a communication service to a mobile station 30 using a traffic channel and a control channel.

Though not illustrated, the base stations 20 can be connected to another network via a network element, called a base station controller (BSC) or a radio network controller (RNC).

The base stations 20 can be classified into an asynchronous mobile communication system and a synchronous mobile communication system according to an upper network element to which they are connected, and the radio transmission scheme they support. In the case of an asynchronous mobile communication system, the base station is called a "Node B," but it will be referred to as "base station" herein for convenience. Inter-system handover occurs when the mobile station 30 passes through an area where base stations belonging to heterogeneous systems overlap with each other (i.e., from one asynchronous mobile communication system base station to another).

Figure 2:
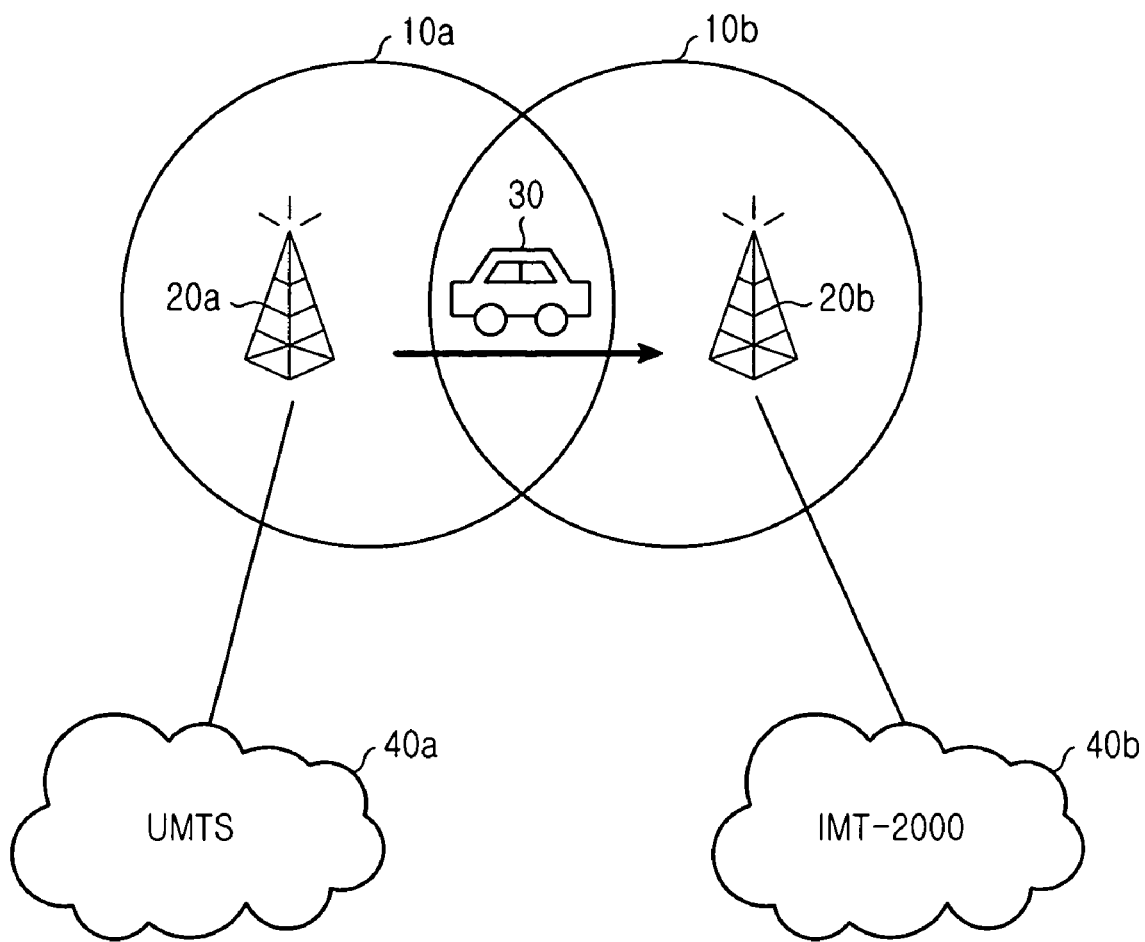
FIG. 2 is a diagram illustrating overlapping between heterogeneous systems to which the present invention is applied.

FIG. 2 is a diagram illustrating overlapping between heterogeneous systems to which an embodiment of the present invention is applied. Referring to FIG. 2, a mobile station 30 is moving from an area where a first cell 10a belonging to an asynchronous base station 20a overlaps with a second cell 10b belonging to a synchronous base station 20b toward the second cell 10b. The asynchronous base station 20a is connected to a UMTS network 40a, commonly referred to as a wideband CDMA (W-CDMA) network, which is specified in the $3^{rd}$ generation partnership project (3GPP) standard, while the synchronous base station 20b is connected to an IMT-2000 network 40b, commonly referred to as a CDMA network, which is specified in the $3^{rd}$ generation partnership project-2(3GPP2) standard.

The mobile station 30 is a dual-mode mobile station supporting both an asynchronous mode (or WCDMA mode) defined by the 3GPP standard and a synchronous mode (or CDMA mode) defined by the 3GPP2 standard.

Figure 3:
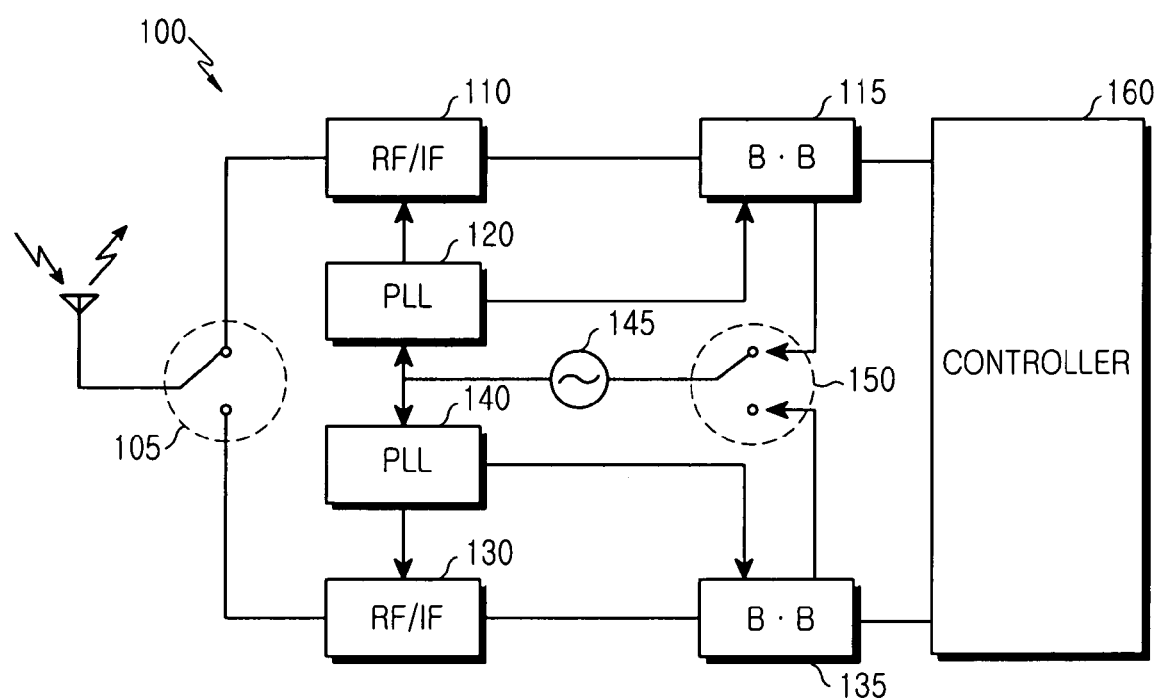
FIG. 3 is a block diagram illustrating a schematic structure of a dual-mode mobile station for both an asynchronous system and a synchronous system according to an embodiment of the present invention.

FIG. 3 is a block diagram illustrating a schematic structure of a dual-mode mobile station for both an asynchronous system and a synchronous system according to an embodiment of the present invention. Referring to FIG. 3, a dual-mode mobile station is constructed so that radio frequency/intermediate frequency (RF/IF) sections 110 and 130, phase locked loops (PLLs) 120 and 140, and baseband (B.B) processors 115 and 135 are separately provided for WCDMA signal processing and CDMA signal processing, and a controller 160, an oscillator 145 and an antenna are shared and switched by switches 105 and 150 according to an operation mode.

In an asynchronous mode of operation, the first and second switches 105 and 150 are switched to WCDMA modules 110, 115 and 120. In a synchronous mode of operation, the first and second switches 105 and 150 are switched to CDMA modules 130, 135 and 140.

In the following description, a procedure for acquiring timing of a synchronous system by a mobile station operating in an asynchronous system will first be described, and thereafter, a procedure for performing handover from an asynchronous mobile communication system to a synchronous mobile communication system by the mobile station that has already acquired timing of the synchronous system will be described.

In an embodiment of the present invention, timing information for a synchronous mode of operation of a mobile station is provided from an asynchronous base station. Therefore, the controller 160 acquires timing information for a synchronous mode of operation through the WCDMA modules, and provides the acquired timing information to the CDMA modules. At the same time, the WCDMA modules are synchronized to the same timing information as that of the CDMA modules.

A synchronous mobile communication system synchronizes all base stations using a GPS receiver. In an asynchronous mobile communication system, all base stations are independent in synchronization, and each base station uses the same timing information together with the mobile stations in a corresponding cell. Timing information used by a base station in the asynchronous mobile communication system includes a base station frame number (BFN) and a system frame number (SFN).

The BFN is a value used by a base station to perform self-synchronization during initialization, and is used to distinguish frames in the base station. The SFN is a value used for frame exchange with a mobile station in each cell of a base station, and has a predetermined offset value (T_Cell) of each cell for a corresponding BFN. BFN and SFN are both modulo operation values that increase from 0 to 4096 by one every 10 ms.

According to an embodiment of the present invention, the asynchronous base stations constituting a service area of an asynchronous mobile communication system, which neighbor a service area of a synchronous mobile communication system are synchronized to a GPS time, like the synchronous mobile communication system. Herein, the asynchronous base stations neighboring the service area of the synchronous mobile communication system will be referred to as "border base stations." Although the border base stations operate in accordance with 3GPP, the asynchronous mobile communication standard, their self-synchronizations are matched to a GPS time. To this end, the border base stations can include a GPS receiver.

For example, assuming that in the network model simplified in FIG. 1, among a total of 7 base stations 10a to 10g, the first 4 base stations 10a to 10d belong to an asynchronous mobile communication system while the other base stations 10e to 10g belong to a synchronous mobile communication system, then 3 base stations 10a, 10b and 10d become border base stations. In this case, one asynchronous base station 10c performs self-synchronization, but the border base stations 10a, 10b and 10d are constructed as synchronous-mode WCDMA base stations that use GPS synchronization, like the synchronous base stations 10e to 10g.

The border base stations generate BFN in synchronism with the GPS time. BFN is generated by a modulo-4096 operation, and since 4096 is a multiple of 8, the border base stations generate a BFN each time a GPS time becomes a multiple of 80 ms, so that the BFN becomes a multiple of 8. Here, the 80 ms refers to the period for which a synchronous base station transmits a synchronization channel frame. SFN, a cell parameter, has an offset value T_Cell in a 256-chip (1/3.84Mcps) unit at BFN. The border base station informs the mobile station of a difference value, i.e., T_Cell value, between BFN and SFN, through a system information block (SIB) that is periodically transmitted over a common control channel. Stated alternatively, the BFN can be determined by subtracting the T_Cell value from the SFN.

A mobile station in an idle state recognizes that a current cell is in a synchronous mode by analyzing the system information block, and extracts CDMA neighbor cell information from it. A mobile station in an active state can acquire information on neighboring synchronous base stations by a radio resource control (RRC) measurement control message received over a control channel. The information on the neighboring synchronous base stations is called a "neighbor list." Frequency information and PN offset information of neighboring cells are included in the neighbor list therein. The "PN offset information" refers to a time offset of a known PN code used for spreading of a pilot signal in a synchronous mobile communication system, and is used as a means for identifying a synchronous base station.

A mobile station obtains the SFN by demodulating the common control channel, and then calculates the BFN using the difference between SFN and BFN, acquired from the system information block. The mobile station can calculate the BFN based on the knowledge that the time when the BFN becomes a multiple of 8 is a time when a GPS time becomes a multiple of 80 ms (i.e., an 80 ms "border"). The mobile station that matched BFN synchronization to an 80 ms border based on the BFN, is synchronized to a synchronous CDMA base station at an 80 ms border. Since the period of a PN code is 80/3 ms, a base station can search a pilot signal from a synchronous base station by consulting frequency information and PN offset information included in a neighbor list.

Figure 4:
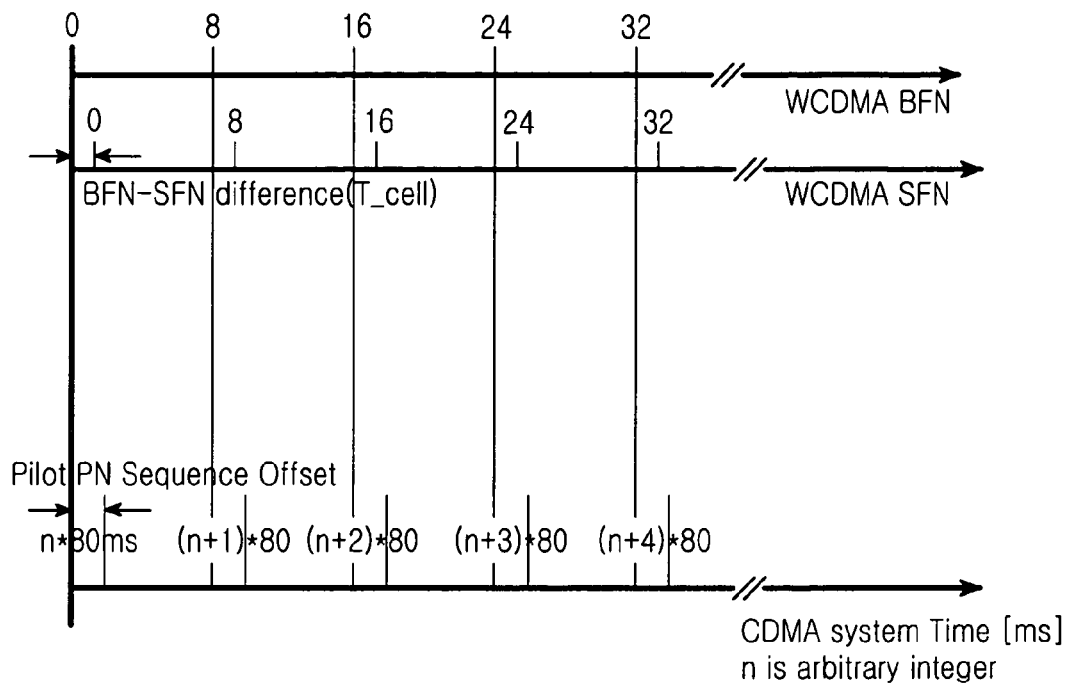
FIG. 4 is a timing diagram illustrating a base station frame number (BFN) and system frame number (SFN) of a border base station and a system time of a synchronous base station according to an embodiment of the present invention.

FIG. 4 is a timing diagram illustrating the BFN and SFN of a border base station and a system time of a synchronous base station according to an embodiment of the present invention.

Referring to FIG. 4, the system time of a synchronous base station becomes a multiple of 80 ms at a time when the BFN becomes a multiple of 8. When a first BFN is generated after power on, a border base station counts BFN from 0 at the time when a GPS time becomes a multiple of 80 ms. SFN has a time offset from BFN by T_Cell. The mobile station searches for a pilot signal from a base station at the time when the PN offset has elapsed from a time when the BFN becomes a multiple of 8.

Figure 5:
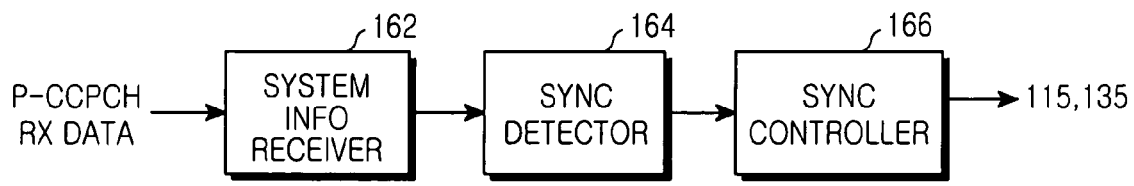
FIG. 5 is a block diagram illustrating a structure of a mobile station for acquiring timing information of a synchronous base station according to an embodiment of the present invention.

FIG. 5 is a block diagram illustrating a structure of a mobile station for acquiring timing information of a synchronous base station according to an embodiment of the present invention.

Referring to FIG. 5, a system information receiver 162 receives the SFN and a system information block (SIB) from a border base station over a primary common control physical channel (P-CCPCH). A synchronization detector 164 acquires the T_Cell data from the system information block, calculates the BFN by subtracting the T_Cell from the SFN, and calculates a start point of an 80 ms frame from the BFN. Since the BFN is synchronized to an 80 ms border of the GPS time by the border base station, a synchronization controller 166 generates timing information based on the BFN and provides the generated timing information to the WCDMA baseband processor 115 and the CDMA baseband processor 135 illustrated in FIG. 3. The baseband processors 115 and 135 then search pilot signals from the synchronous base stations at the 80 ms border of the GPS time.

Figure 6:
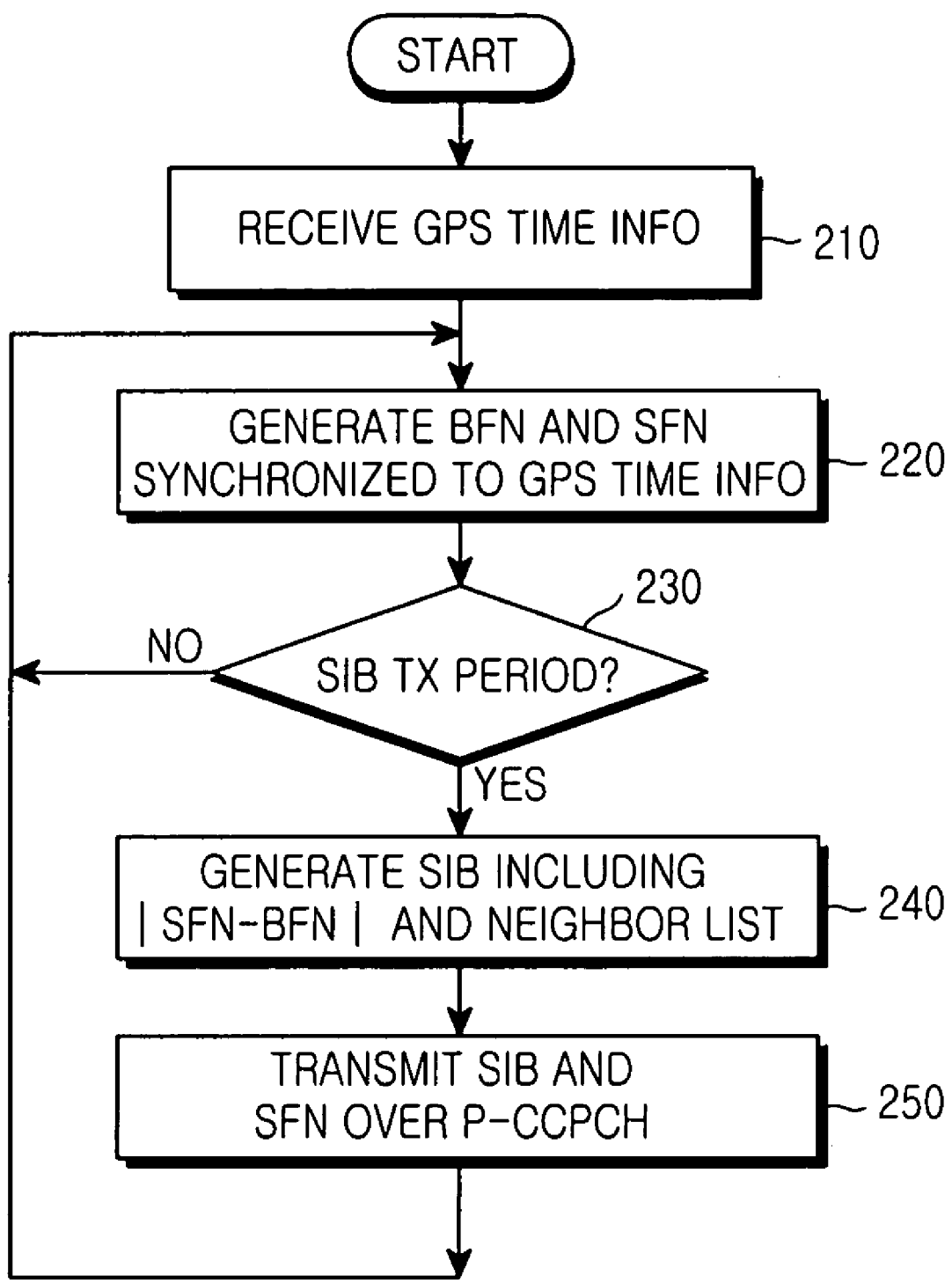
FIG. 6 is a flowchart illustrating an operation of matching synchronization to a GPS time and providing corresponding timing information to a mobile station by a border base station according to an embodiment of the present invention.

FIG. 6 is a flowchart illustrating an operation of matching synchronization to a GPS time and providing corresponding timing information to a mobile station by a border base station according to an embodiment of the present invention. Referring to FIG. 6, a border base station receives GPS time information from a GPS receiver in step 210, and counts the BFN from 0 at the time when the GPS time becomes a multiple of 80 ms, in step 220. At each multiple of 80 ms, each affiliated cell of the border base station generates an SFN having an offset value T_Cell corresponding to the BFN. The BFN and the SFN increase by one every 10 ms, and become 0 again when they reach 4095.

In decision step 230, the method determines whether a transmission period of the system information block SIB occurred. If an SIB transmission period has occurred, the border base station generates, in step 240, a symbol information block including the T_Cell a difference value between SFN and BFN of each cell, and a neighbor list ("Yes" path from decision step 230). In step 250, the border base station transmits the generated system information block to a mobile station over a P-CCPCH along with the SFN of a corresponding cell.

Figure 7:
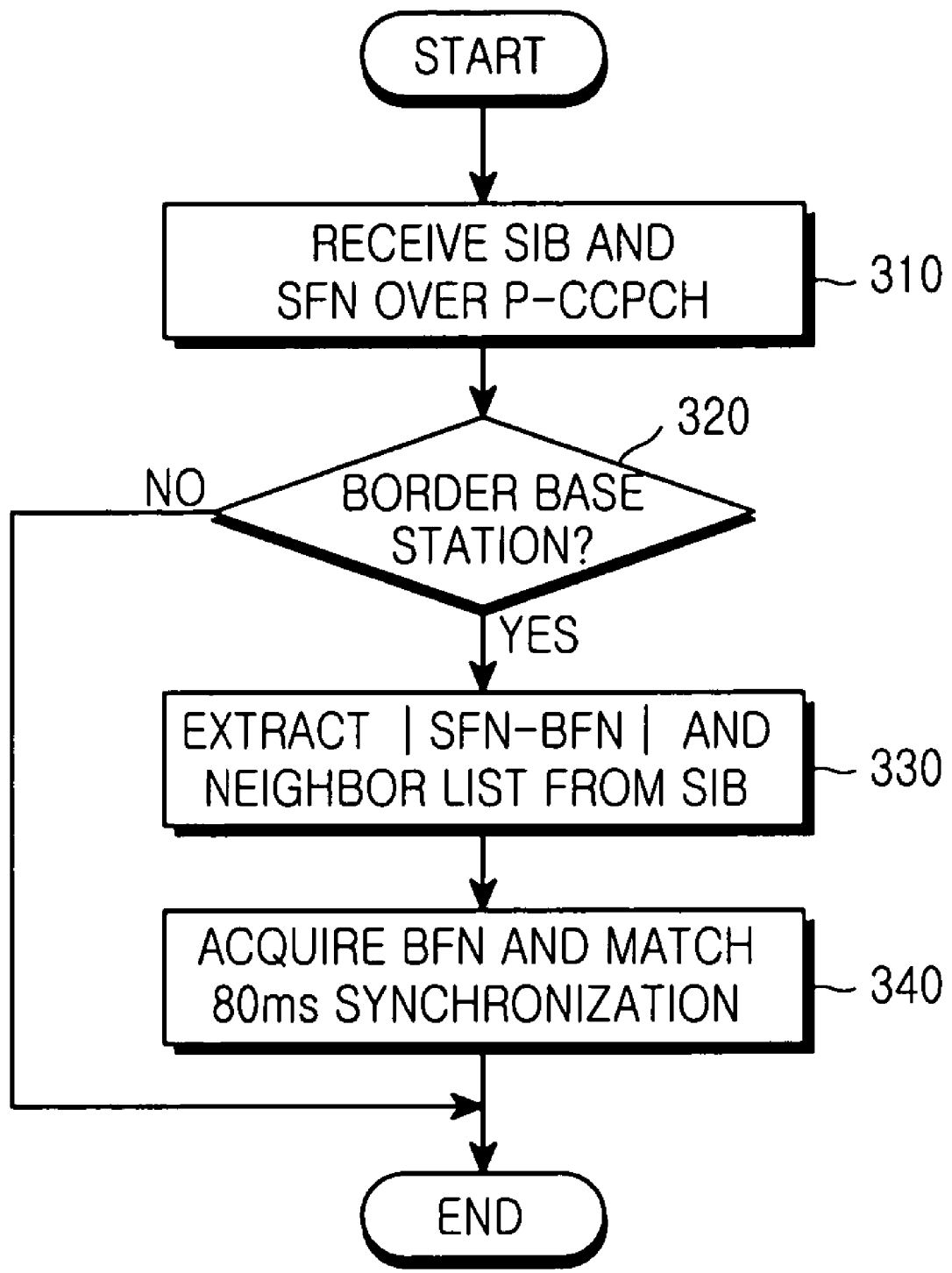
FIG. 7 is a flowchart illustrating an operation of acquiring timing information of a synchronous base station by a mobile station according to an embodiment of the present invention.

FIG. 7 is a flowchart illustrating an operation of acquiring timing information from a synchronous base station by a mobile station according to an embodiment of the present invention. It will be assumed herein that the mobile station is a dual-mode mobile station capable of communicating with both an asynchronous mobile communication system and a synchronous mobile communication system, and is operating in an asynchronous mode.

Referring to FIG. 7, the mobile station receives a system information block (SIB) and SFN of a corresponding cell over a P-CCPCH in step 310, and determines in step 320 whether a current cell is a border base station. The mobile station determines whether a current cell is a border base station, depending upon whether the border base station indication information included in the system information block is 'true' or whether a difference value between BFN and SFN is included in the system information block. If the current cell is not a border base station ("No" path from decision step 320), the mobile station is tuned to the SFN. Alternatively, if the current cell is a border base station, the mobile station extracts a difference value T_Cell between BFN and SFN and a neighbor list from the system information block in step 330 ("Yes" path from decision step 320), and calculates in step 340 the BFN by subtracting the T_Cell from the SFN and searches the 80 ms frame border time. The 80 ms frame border time is a time when the BFN becomes a multiple of 8, and is recognized as a border time of a GPS satellite time.

Figure 8:
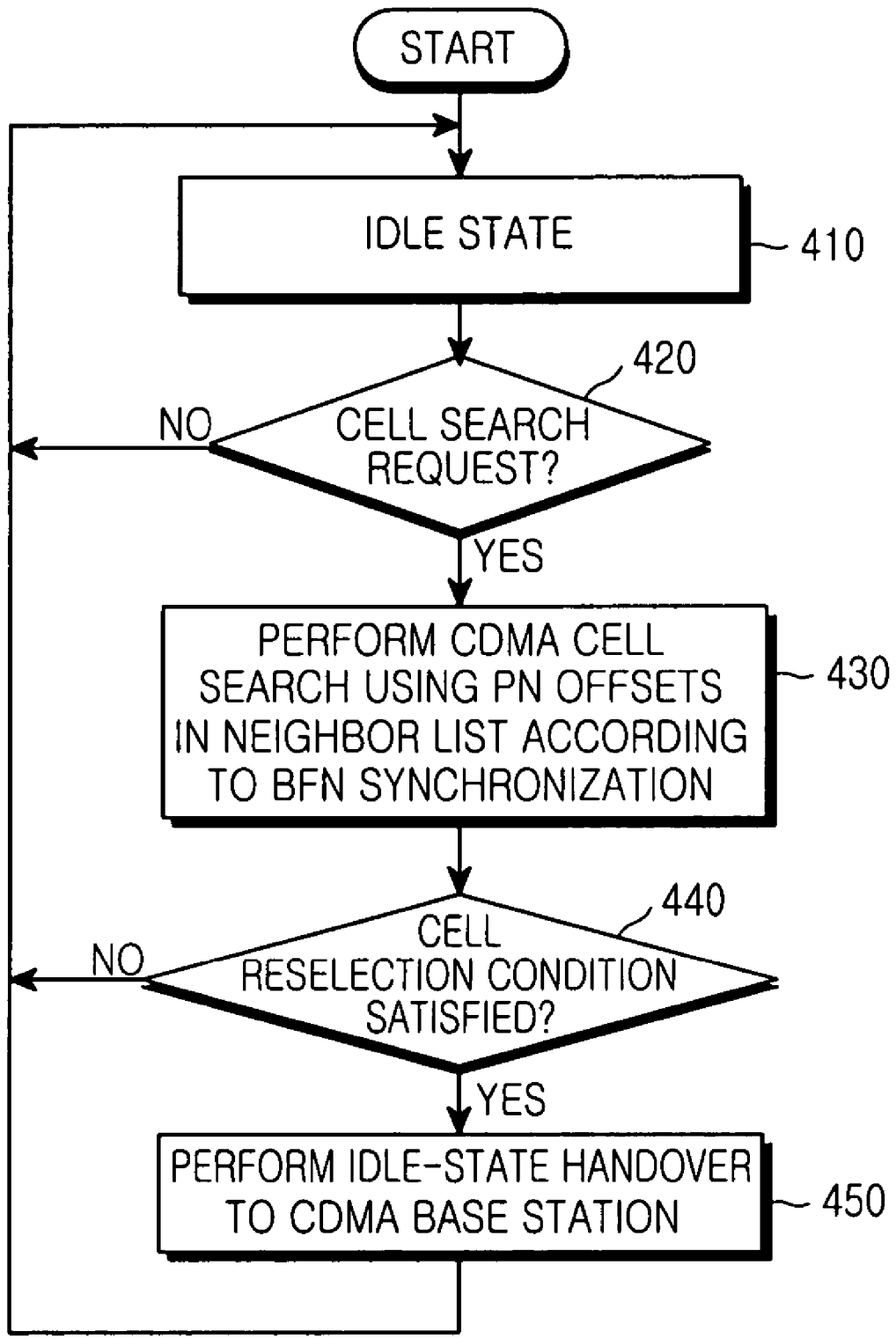
FIG. 8 is a flowchart illustrating an operation of performing handover from an asynchronous base station to a synchronous base station in an idle state by a mobile station that acquired timing information of the synchronous base station, according to an embodiment of the present invention.

FIG. 8 is a flowchart illustrating an operation of performing handover from an asynchronous base station to a synchronous base station in an idle state by a mobile station that acquired timing information of the synchronous base station, according to an embodiment of the present invention. It will be assumed herein that a mobile station is located in a cell area of a border base station and has already acquired a BFN synchronized to an 80 ms border of a synchronous base station and a neighbor list in accordance with the procedure illustrated in FIG. 7. Here, the neighbor list includes frequency information and PN offset information of neighbor cells.

Referring to FIG. 8, in step 410, the mobile station is in an idle state of an asynchronous mode. If an inter-radio access technology (RAT) cell reselection condition in a system information block is satisfied in step 420 (e.g., if the strength of a signal received from a currently tuned border base station is lower than or equal to a predetermined threshold), the mobile station performs a CDMA cell search by consulting the previously received neighbor list of a synchronous system in step 430 ("Yes" path from decision step 420). Specifically, the mobile station searches for a pilot signal at the time when a corresponding PN offset has elapsed from the time when the BFN becomes a multiple of 8 at each pilot signal frequency, by using frequency and PN offset information of synchronous base stations, which is included in the neighbor list. If a CDMA pilot signal having a level higher than or equal to a predetermined threshold is detected in step 440, the mobile station, in step 450, switches its operation mode to a synchronous mode, performs idle-state handover to a synchronous base station that transmits the detected CDMA pilot signal, and then receives a synchronization channel frame and paging channel messages ("Yes" path from decision step 440).

Figure 9:
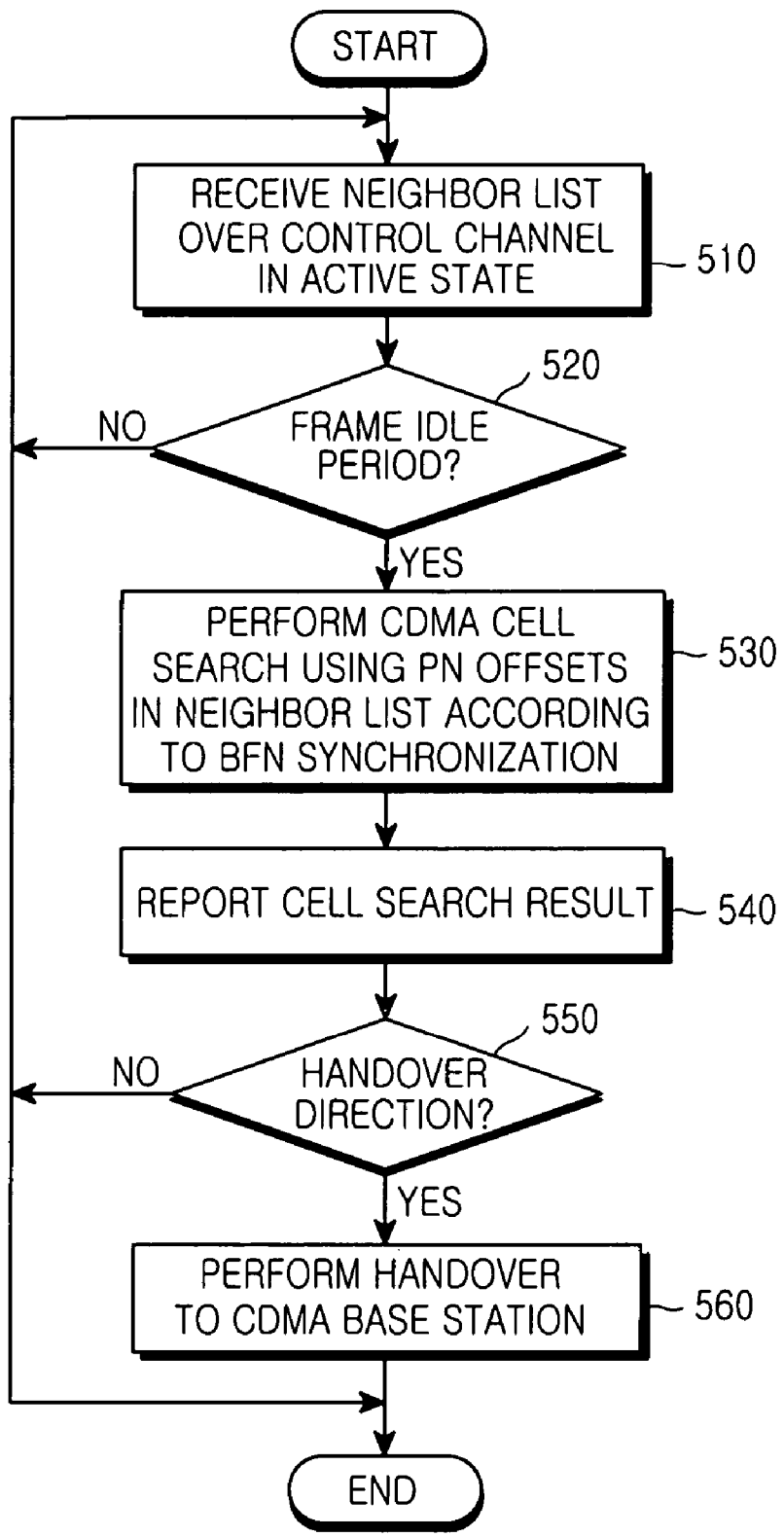
FIG. 9 is a flowchart illustrating an operation of performing handover from an asynchronous base station to a synchronous base station in an active state by a mobile station that acquired timing information of the synchronous base station according to an embodiment of the present invention.

FIG. 9 is a flowchart illustrating an operation of performing handover from an asynchronous base station to a synchronous base station in an active state by a mobile station that acquired timing information of the synchronous base station according to an embodiment of the present invention. Likewise, it will be assumed herein that the mobile station is located in a cell area of a border base station and has already acquired the BFN synchronized to an 80 ms border of a synchronous base station and a neighbor list in accordance with the procedure illustrated in FIG. 7. The neighbor list includes frequency information and PN offset information of neighbor cells.

Referring to FIG. 9, in step 510, the mobile station is in an active state of an asynchronous mode. In step 520, the mobile station determines whether an operation period of a compressed mode has come. If the operation period has not come, the mobile station returns to step 510 to hold the active state ("No" path from decision step 520). If the compressed mode operation period has occurred ("Yes" path from decision step 520), the mobile station searches the frequencies of neighboring cells for an idle period of a frame secured by compressed transmission of data in step 530. The mobile station performs the search in step 530, during the period of time when the PN offsets in the neighbor list have elapsed from the time when the BFN becomes a multiple of 8. Since the mobile station has already acquired timing information (i.e., BFN synchronized to a 80 ms border) of a synchronous base station, it can rapidly complete PN search of CDMA cells for the idle period of a frame.

In step 540, the mobile station reports, to a radio network controller, the levels of pilot signals from the CDMA cells, as determined by the search result according to an inter-RAT measurement report condition received from the system. For example, the measurement report condition can be the case when detected levels of pilot signals from the CDMA cells are higher than or equal to a predetermined threshold. The radio network controller directs handover to a particular CDMA cell when it is determined from the pilot signal levels that handover is necessary ("Yes" path from decision step 550). Specifically, if a detected pilot signal level exceeds the level of a signal received over a current channel by a predetermined threshold, the radio network controller transmits a message directing handover to a CDMA cell having the detected pilot signal level to the mobile station.

If a handover direction is received form the system in step 550, the mobile station drops a call in an asynchronous mode in step 560, and switches its operation mode to a synchronous mode. The switch from an asynchronous mode to a synchronous mode of operation occurs in such a short period of time that a user cannot recognize its occurrence. A hard handover to the corresponding CDMA cell has thus been performed.

As described above, the embodiments of the present invention has the following advantages. The system performs a CDMA base station cell search in a state where a dual-mode mobile station matches synchronization to a CMDA base station every 80 ms in a service area of a border base station. By doing so, it is possible to reduce the cell search time to the same level as that in the CDMA network and to perform cell reselection at an accurate cell border point and time after searching signals from heterogeneous cells. In addition, even when the mobile station moves form an asynchronous mobile communication system to a synchronous mobile communication system during a call, it can perform handover using a compressed mode for a short CDMA cell search time.

In addition, the embodiments of the present invention can reduce a WCDMA cell search time even when handover is performed from a synchronous system to an asynchronous system, particularly to an asynchronous base station that is not synchronized with a synchronous base station currently in service. Therefore, even in the future asynchronous mobile communication standard and synchronous mobile communication standard, it is possible to efficiently perform cell search between heterogeneous standard networks by synchronizing a border base station to a synchronous base station.

While the invention has been shown and described with reference to a certain preferred embodiment thereof, it will be understood by those skilled in the art that various changes in form and details may be made therein without departing from the spirit and scope of the invention as defined by the appended claims. For example, the invention has been described on the assumption that an asynchronous base station geographically neighboring on a service area of a synchronous mobile communication system is defined as a border base station. However, an asynchronous base station that does not need to be synchronized to a synchronous mobile communication system can also be designated as a border base station, even though it does not geographically neighbor a service area of the synchronous mobile communication system. Therefore, the term "border" mentioned herein should be construed as a symbolical meaning rather than a geographical meaning.

What is claimed is:

1. A method for providing timing information for inter-system handover by an asynchronous base station in a mobile communication system including an asynchronous mobile communication network associated with at least one asynchronous base station using independent synchronization, and a synchronous mobile communication network associated with at least one synchronous base station using synchronization matched with a satellite time, the method comprising:
   acquiring information on the satellite time by the asynchronous base station, the asynchronous base station generating a base station frame number (BFN) synchronized to the satellite time and a system frame number (SFN) having a predetermined offset for the BFN for each cell;
   generating a system information block including a difference value between the BFN and the SFN; and
   transmitting the system information block over a common channel along with the SFN from the asynchronous base station.

2. The method of claim 1, wherein:
   the BFN is generated so that the BFN becomes a multiple of 8 at a time when the satellite time becomes a multiple of 80 ms.

3. The method of claim 1, wherein:
   the system information block is repeatedly transmitted at selected periods.

4. The method of claim 1, further comprising:
   including a neighbor list containing frequency information and pseudo-random noise (PN) offset information of at least one neighbor synchronous base station in the system information block; and
   transmitting the neighbor list-included system information block to a mobile station in an idle state over a common channel.

5. The method of claim 1, further comprising:
   including a neighbor list containing frequency information and PN offset information of at least one neighbor synchronous base station in a measurement control message; and
   transmitting the neighbor list-included measurement control message to a mobile station in an active state over a control channel.

6. The method according to claim 1, wherein:
   the steps of acquiring information, generating a system information block and transmitting the system information block are performed by a border base station.

7. The method according to claim 6, wherein:
the border base station is an asynchronous border station.

8. A method for performing inter-system handover from an asynchronous base station to a synchronous base station by a mobile station in a mobile communication system including an asynchronous mobile communication network associated with at least one asynchronous base station using independent synchronization, and a synchronous mobile communication network associated with at least one synchronous base station using synchronization matched with a satellite time, the method comprising:
receiving a system frame number (SFN) of the asynchronous base station for each cell and a system information block from the asynchronous base station over a common channel;
extracting a difference value between a base station frame number (BFN) of the asynchronous base station and the SFN, from the system information block, the BFN being synchronized to the satellite time; and
acquiring frame synchronization of the base station synchronized to the satellite time by applying the difference value to the SFN.

9. The method of claim 8, further comprising:
receiving a system information block including a neighbor list containing frequency information and pseudo-random noise (PN) offset information of at least one neighbor synchronous base station from the asynchronous system; and
searching the at least one neighbor synchronous base station at times when PN offsets in the neighbor list have elapsed from a time when the BFN becomes a multiple of 8.

10. The method of claim 9, further comprising:
performing idle-state handover to the synchronous base station if there is a synchronous base station satisfying a predetermined cell reselection criterion as a result of the search.

11. The method of claim 8, further comprising:
receiving a measurement control message including a neighbor list containing frequency information and pseudo-random noise (PN) offset information of a neighbor synchronous base station in an active state; and
searching at least the one neighbor synchronous base station at times when PN offsets in the neighbor list have elapsed from a time when the BFN becomes a multiple of 8, for an idle period of a frame based on a compressed mode.

12. The method of claim 11, further comprising
reporting the search result to the system, and upon receiving a handover direction to a synchronous base station from the system, performing active-state handover to the corresponding synchronous base station.

13. A mobile communication system including an asynchronous mobile communication network associated with at least one asynchronous base station using independent synchronization, and a synchronous mobile communication network associated with at least one synchronous base station using synchronization matched with a satellite time, the system comprising:
at least one border base station in the asynchronous mobile communication network, the border base station neighboring a service area of the synchronous mobile communication network, and using synchronization matched to the satellite time and providing timing information for the synchronization; and
a dual-mode mobile station capable of communicating with both the asynchronous mobile communication network and the synchronous mobile communication network, the dual-mode mobile station being synchronized to the timing information provided from the border base station,
wherein the timing information represents a base station frame number (BFN) that becomes a multiple of 8 at a time when the satellite time becomes a multiple of 80 ms.

14. The mobile communication system of claim 13, wherein the border base station acquires information on the satellite time, generates a base station frame number (BFN) synchronized to the satellite time and a system frame number (SFN) having a predetermined offset for the BFN for each cell, generates a system information block including a difference value between the BFN and the SFN, and transmits the system information block over a common channel along with the SFN.

15. The mobile communication system of claim 14, wherein the border base station includes a neighbor list containing frequency information and pseudo-random noise (PN) offset information of at least one neighbor synchronous base station in a system information block, transmits the neighbor list-included system information block to a mobile station in an idle state over a common channel, includes a neighbor list containing frequency information and PN offset information of at least one synchronous base station in a measurement control message, and transmits the neighbor list-included measurement control message to a mobile station in an active state over a control channel.

16. The mobile communication system of claim 13, wherein the dual-mode mobile station receives a system frame number (SFN) of the asynchronous base station for each cell and a system information block from the asynchronous base station over a common channel, extracts a neighbor list including a difference value between a base station frame number (BFN) of the asynchronous base station, synchronized to the satellite time, and the SFN, from the system information block, and acquires the BFN synchronized to the satellite time by applying the difference value to the SFN.

17. The mobile communication system of claim 16, wherein the dual-mode mobile station receives a system information block including a neighbor list containing frequency information and PN offset information of at least one neighbor synchronous base station from the asynchronous system, and searches the at least one neighbor synchronous base station at times when PN offsets in the neighbor list have elapsed from a time when the BFN becomes a multiple of 8.

18. The mobile communication system of claim 17, wherein the dual-mode mobile station performs idle-state handover to the synchronous base station, if there is a synchronous base station satisfying a predetermined cell reselection criterion as a result of the search.

19. The mobile communication system of claim 16, wherein the dual-mode mobile station receives a measurement control message including a neighbor list containing frequency information and PN (Pseudo-random Noise) offset information of a neighbor synchronous base station in an active state, and searches at least the one neighbor synchronous base station at times when PN offsets in the neighbor list have elapsed from a time when the BFN becomes a multiple of 8.

20. The mobile communication system of claim 19, wherein the dual-mode mobile station reports the search result to the system, and upon receiving a handover direction to a synchronous base station from the system, performs an active state handover to the corresponding synchronous base station.

* * * * *